(12) United States Patent
Cumbey

(10) Patent No.: US 10,989,097 B2
(45) Date of Patent: Apr. 27, 2021

(54) EXHAUST SYSTEM FOR VEHICLE

(71) Applicant: International Truck Intellectual Property Company, LLC, Lisle, IL (US)

(72) Inventor: Thomas L. Cumbey, West Chicago, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 16/374,054

(22) Filed: Apr. 3, 2019

(65) Prior Publication Data

US 2020/0318524 A1 Oct. 8, 2020

(51) Int. Cl.
*F01N 13/08* (2010.01)
*B60K 13/04* (2006.01)
*F01N 13/00* (2010.01)
*F01N 13/10* (2010.01)

(52) U.S. Cl.
CPC ............ *F01N 13/085* (2013.01); *B60K 13/04* (2013.01); *F01N 13/008* (2013.01); *F01N 13/10* (2013.01); *F01N 2240/22* (2013.01); *F01N 2560/028* (2013.01); *F01N 2570/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,426,526 A | * | 2/1969 | Tornmarck | B01D 53/26 60/309 |
| 7,056,367 B2 | * | 6/2006 | Trivett | B01D 47/06 95/226 |
| 7,713,493 B2 | * | 5/2010 | Bosanec, Jr. | F01N 1/083 422/180 |
| 2006/0123774 A1 | * | 6/2006 | Kang | F01N 3/005 60/309 |
| 2009/0084083 A1 | * | 4/2009 | Vachon | F01N 13/20 60/273 |
| 2011/0151760 A1 | * | 6/2011 | Olsen | F01N 13/00 454/41 |
| 2014/0182718 A1 | * | 7/2014 | Wolfcarius | F01N 13/082 137/561 A |

* cited by examiner

*Primary Examiner* — Binh Q Tran
(74) *Attorney, Agent, or Firm* — Jeffrey P. Calfa; Mark C. Bach

(57) ABSTRACT

Disclosed is an exhaust system for a vehicle having an exhaust passageway through which products of combustion from the engine pass through and out to atmosphere, which exhaust system has a bead portion formed in the exhaust passageway with one more holes in the lower portion thereof through which at least a portion of the rain which has entered the interior of the exhaust passageway may flow out from the interior of the exhaust passageway prior to flowing downward to a lower portion of the exhaust passageway at which the rain is undesirable.

9 Claims, 2 Drawing Sheets

EXHAUST SYSTEM FOR VEHICLE

FIELD OF THE INVENTION

The present invention pertains to exhaust systems for vehicles and mitigating moisture accumulation in exhaust systems.

RELATED ART

There are a wide variety of exhaust systems currently used in connection with motorized vehicles for conveying exhaust gases discharged from the vehicle's engine to atmosphere. Many semi-trailer trucks have at least one vertical exhaust stack (or at least a portion of the exhaust stack has a vertical portion or vector) as part of the exhaust system, which is connected to the vehicle and conveys exhaust gases from the engine exhaust and discharges the exhaust at a location higher than the exhaust manifold, commonly higher than the vehicle itself, or higher than the load they are carrying.

Some truckers also appreciate having large, shiny chrome exhaust pipes on either side of the truck cab to enhance the aesthetics of the vehicle. However, an issue associated with such vertical exhaust systems is that when the vehicle is operated in rainy conditions, rain may enter the upper, open end of the exhaust stack, accumulate on the interior passageway surface of the exhaust stack, and roll or migrate downwardly along the interior passageway surface of the exhaust stack under the influence of gravity, and into the exhaust manifold or into contact with a sensor proximate the exhaust manifold resulting in detrimental effects. There is a desire for an exhaust system which prevents or reduces rain entering the exhaust stack of an exhaust system from flowing down into the exhaust manifold or down to a sensor proximate the engine's exhaust manifold, to mitigate the potentially detrimental effects from such rainwater.

SUMMARY

The present disclosure is an exhaust system for a vehicle having a vertical exhaust stack or fluid exhaust passageway which prevents or reduces rain entering the exhaust stack of the exhaust system from flowing down into the exhaust manifold of the vehicle's engine, or down to a sensor which is disposed proximate the exhaust manifold, or otherwise disposed at a lower area of the exhaust stack. The disclosed exhaust system has an exhaust stack or exhaust passageway having a proximate end fluidly connected with the exhaust manifold for receiving exhaust gases from the engine, and a distal end for emitting the exhaust gases to atmosphere. The exhaust passageway defines an interior passageway surface and an exterior passageway surface, and has at least a portion thereof which extends vertically, or having a vertical vector, such that fluid entering the distal end of the fluid passageway may flow downwardly under the influence of gravity toward the intake manifold. The exhaust passageway has at least one outwardly protruding bead portion formed therein intermediate of the proximate end and the distal end of the exhaust passageway, with the bead portion having an upper portion and lower portion, and with the bead portion having one or more holes or apertures therein on a lower portion of the bead portion of the exhaust passageway through which at least a portion of the water in the bead portion of the exhaust passageway may be released to atmosphere and out from the interior of the exhaust stack under the influence of gravity prior to passing past the bead portion of the exhaust passageway.

DESCRIPTION OF THE DRAWINGS

The disclosure set forth herein will become more apparent and will be better understood by reference to the following description of embodiments of the exhaust system taken in conjunction with the accompanying drawings, wherein.

DETAILED DESCRIPTION

Figure 1:
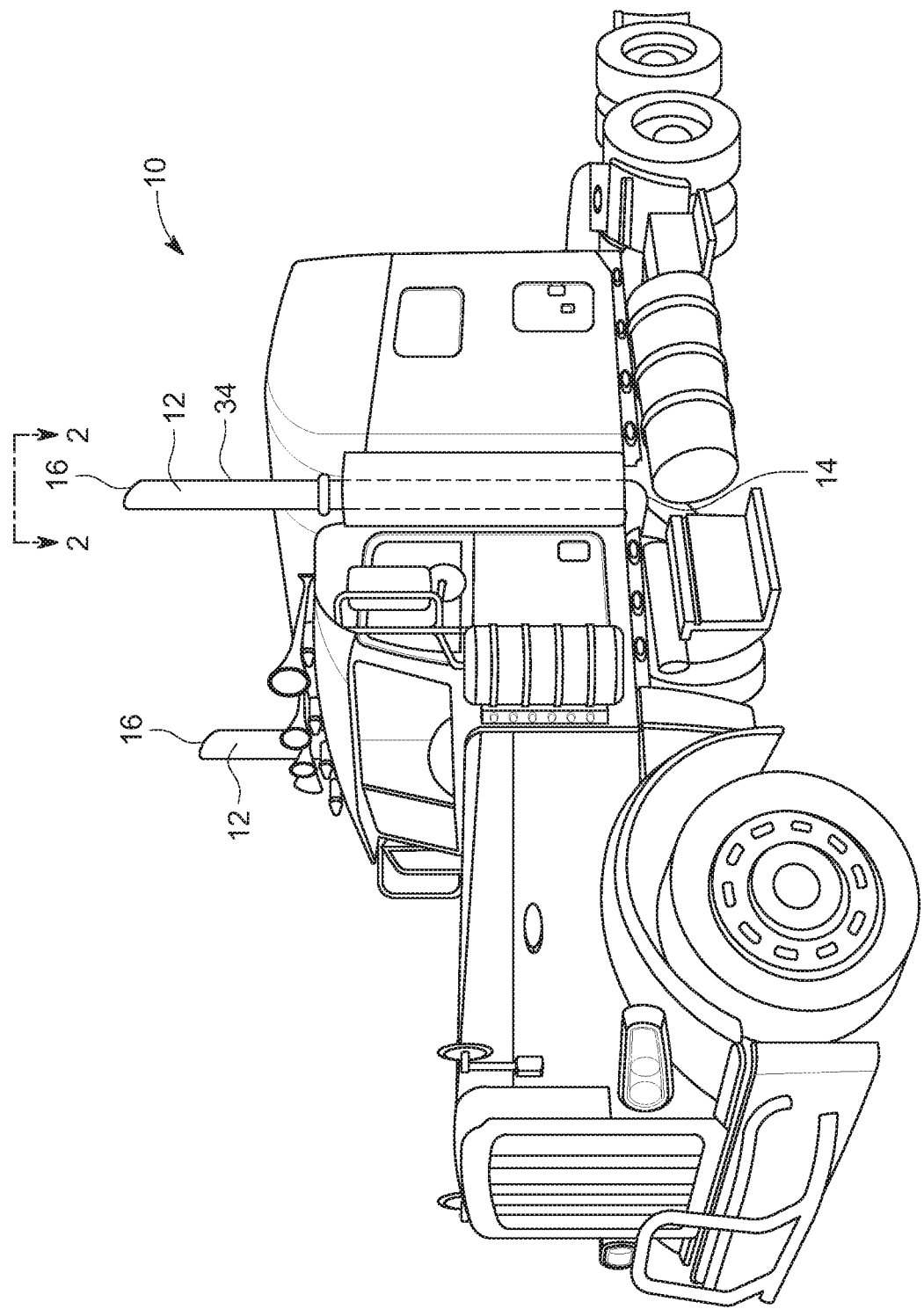
FIG. 1 is a perspective view of a tractor trailer having a vertical exhaust stack on either side of the vehicle cab.

With initial reference to FIG. 1, a vehicle 10 is shown having a pair of vertical exhaust stacks 12 extending upwardly on either side of the vehicle. The vertical exhaust stacks 12 are part of an exhaust system which conveys exhaust gases from the engine of the vehicle (not shown) from a lower end 14 of the vertical exhaust stack 12 to an upper end 16 of the exhaust stack 12, at which the exhaust gases are discharged to atmosphere.

When the vehicle encounters rain falling downwardly onto the vehicle some rain may enter the open upper end 16 of the exhaust stack 12 and migrate downwardly under the influence of gravity through the interior of the exhaust stack 12 which may cause undesirable moisture in the exhaust manifold of the engine and/or on or near one or more sensors disposed near the exhaust manifold (not shown).

Figure 2:
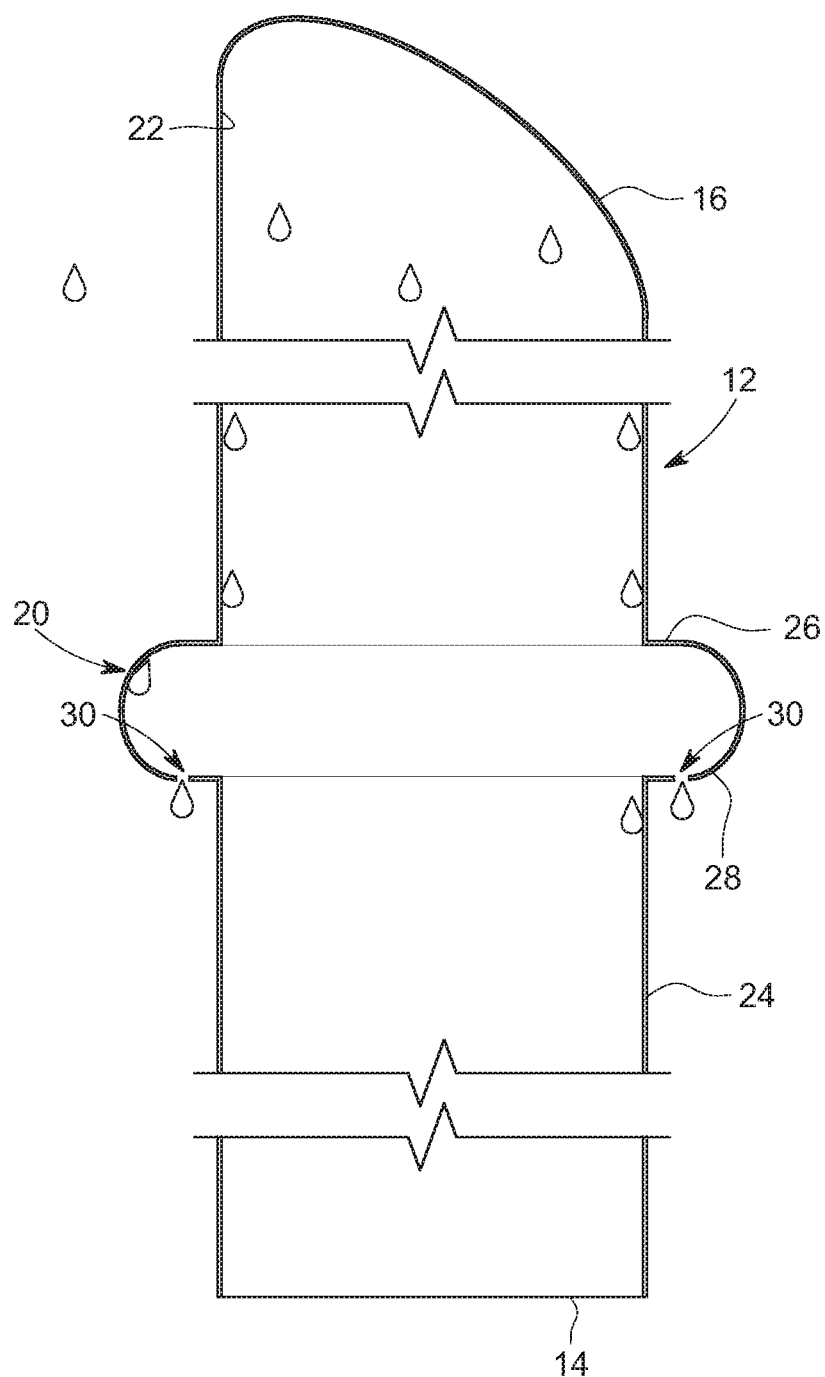
FIG. 2 is a partial, cross-sectional view of a vertical portion of the exhaust stack of FIG. 1, taken along the line 2-2 of FIG. 1.

With reference now to FIG. 2, the exhaust passageway 12 defines an interior passageway surface 22 and an exterior passageway surface 24. The exhaust passageway 12 has at least a portion thereof with a vertical vector such that fluid entering the distal end 16 of the exhaust passageway 12 may flow downwardly under the influence of gravity toward the intake manifold toward the lower, or proximate, end 14 which is fluidly connected with the exhaust manifold for receiving exhaust gases from the engine. Although only vertical examples are illustrated, it will be appreciated that all or a portion of the exhaust passageway 12 may extend at an angle off of vertical, so long as the exhaust passageway 12 has at least a portion thereof with a vertical vector.

With reference now to FIG. 2, to reduce or eliminate the rain migrating down the stack 12 sufficiently that it causes undesirable moisture in the exhaust manifold of the vehicle's engine, an outwardly protruding bead portion 20 may be formed in the exhaust passageway 12 at a location which is both: 1) intermediate the lower, or proximate, end 14 of the exhaust passageway 12 which is fluidly connected with the exhaust manifold for receiving exhaust gases from the engine and the upper, or distal, end 16 of the exhaust passageway from which exhaust gases are emitted to atmosphere; and 2) a location at which the exhaust passageway 12 has a vertical vector. The bead portion 20 defines an upper portion 26 and a lower portion 28. One or more apertures or holes 30 may be formed in the lower portion 28 of the bead portion 20 of the exhaust passageway 12.

As best seen in FIG. 2, at least a portion of the rain entering the open, upper end 16 of the exhaust passageway 12 may contact the interior passageway surface 22 and flow or roll down the interior passageway surface 22 and into the bead portion 20. After flowing into the bead portion 20, at least a portion of the rain that had flowed into the bead portion 20 may flow through the one or more holes 30 in the lower portion 28 of the bead portion 20 of the exhaust passageway 12 and outwardly from the interior of the exhaust passageway 12 under the influence of gravity. The rain which has passed through the one or more holes 30 in the bead portion 20 of the exhaust passageway 12 may fall downwardly without contacting the exterior passageway surface 24, or the rain which has passed through the one or more holes 30 in the bead portion 20 of the exhaust passageway 12 may flow or roll further downwardly along the exterior passageway surface, or both, but in either event the rain which has been emitted through the one or more holes 30 remains removed from the interior of the exhaust passageway 12. Accordingly, the presence of the bead portion 20 having one or more holes 30, and being disposed at a location above the location at which rain or moisture is undesirable, may reduce or even prevent, rain from flowing downwardly along the interior passageway surface 22 past the bead portion 20 to a lower location at which it may be undesirable and problematic.

The bead portion 20 may be formed of various shapes, some more suited to allowing rain and moisture to accumulate in the bead portion 20 and some more suited to not allowing rain and moisture to accumulate in the bead portion 20. For instance, the bead portion may be a semi-teardrop shape or lobe shape, with one or more holes in the lower portion of the teardrop or lobe shape, which may be beneficial for minimizing or reducing the amount of rain which is allowed to flow downwardly past the bead portion 20.

It may be desirable to provide two or more bead portions 20 with each bead portion having its own respective holes 30 disposed on the lower side. A corrugated tube may be used having holes in the lower portions of two or more lower sections of the corrugation.

When the vehicle supporting the exhaust stack is in motion, the movement of the stack relative to the rain may cause a more significant portion of the rain, or all of the rain, entering the stack to contact the interior passageway surface 22 of the stack and run down the inner wall of the stack under the influence of gravity. Of course, rain which falls through the exhaust passageway 12 without contacting the interior passageway surface 22 may not be diverted or discharged from the interior of the exhaust passageway 12 prior to flowing downwardly into undesirable proximity or contact with the intake manifold or sensors disposed below the bead portion 20. In this regard, the disclosed exhaust system structure may be more beneficial when used on vehicles which are moving, rather than stationary applications; however, benefits of the disclosed structure may be realized for both stationary as well as moving vehicles.

Since accelerations of the vehicle 10 may cause rain disposed within the interior of the exhaust passageway 12 to move to the rearward side 34 of the exhaust passageway 12 which is the side opposite the direction of acceleration, and in this regard it may be desirable to provide at least one, or all, of the one or more holes 30 in the bead portion 20 at a location at, or near, the rearward side 34 of the exhaust passageway 12. The acceleration of the vehicle 10 may then result in enhanced forcing of rain out through the holes 30 in the rearward side 34 of the exhaust passageway 12, owing at least in part to the force on the water from acceleration.

In various embodiments it may be desirable to put a cap or cover over the upper end 16 of the stack or exhaust passageway 12 which is moveable between a position in which the cap covers the stack opening to prevent rain from entering the stack, and a position in which the cap does not cover the stack opening or only partially covers the stack opening, with the cap being moveable to this open or partially open position when the vehicle is in motion to allow discharge of exhaust from the upper end 16 of the exhaust passageway 12, and moveable to the closed position when the vehicle is stationary to prevent rain and/or debris from entering the exhaust passageway 12. The embodiments disclosed herein may allow the exhaust caps to be eliminated or closed less frequently, which may result in less back pressure on the exhaust system and may provide greater fuel economy.

As used herein, vertical exhaust stack means an exhaust stack having at least a portion thereof with a vertical vector. That is, even though descriptions and drawings such as that of FIG. 2 discuss and depict the present disclosure by way of a vertical portion of an exhaust stack, the same descriptions may be applied to any portion of an exhaust stack having a vertical vector and the disclosure is not limited in any way to strictly vertical sections of an exhaust stack.

What is claimed is:

1. An exhaust system for operating in rain a vehicle having an engine which emits exhaust gases through an exhaust manifold, the exhaust system comprising:
    an exhaust passageway of a singular pipe having a proximate end fluidly connected with the exhaust manifold for receiving exhaust gases from the engine, and a distal end for emitting exhaust gases to atmosphere and through which the rain may enter the exhaust passageway;
    said exhaust passageway of the singular pipe defining an interior passageway surface and an exterior passageway surface;
    said exhaust passageway having at least a portion thereof with a vertical vector such that fluid entering the distal end of the passageway may flow downwardly along the interior passageway surface under the influence of gravity toward the intake manifold;
    said exhaust passageway of the singular pipe having at least one outwardly protruding bead portion formed therein intermediate of the proximate end and the distal end of the singular pipe;
    the bead portion having an upper portion and a lower portion;
    said bead portion being disposed on a vertical vector portion of the exhaust passageway and having one or more open drain holes therein on a lower portion of the bead through which at least a portion of water in the bead may be released from the interior of the exhaust passageway prior to flowing further in a downward direction past the bead portion of the exhaust passageway.

2. An exhaust system in accordance with claim 1 in which the the singular pipe defines a longitudinal axis at the location of the bead and the bead extends radially outwardly relative to the longitudinal axis.

3. An exhaust system in accordance with claim 1 in which the bead portion is configured to collect at least a portion of the rain flowing downwardly along the interior passageway surface of the exhaust passageway of the singular pipe before the rain flows through the one or more open holes.

4. An exhaust system in accordance with claim 1 in which the bead portion is disposed on a vertically extending section of the exhaust passageway of the singular pipe.

5. An exhaust system in accordance with claim 1 in which the bead portion is disposed on a section of the exhaust passageway which extends at an angle between horizontal and vertical.

6. An exhaust system in accordance with claim 1 in which the bead defines a semi-circular configuration.

7. An exhaust system in accordance with claim 1 in which the exhaust passageway is used on a vehicle which may travel in a given driving direction, such that the exhaust passageway defines a forward side in the direction of vehicle travel and a rearward side opposite the direction of travel, and at least a portion of the one or more holes in the bead portion are disposed on the rearward side of the exhaust passageway.

8. An exhaust system in accordance with claim 1 in which the bead portion and holes are configured to prevent any rain from flowing downwardly along the interior passageway surface past the bead portion.

9. A singular exhaust pipe for use with an engine which emits exhaust gases through an exhaust manifold, comprising:
- a fluid exhaust passageway defining an interior surface and an exterior surface, and having a proximal end fluidly connected with the exhaust manifold for receiving exhaust gases from the engine, and having a distal end for emitting exhaust gases to atmosphere and through which rain may enter the exhaust passageway;
- said exhaust passageway having at least a portion thereof with a vertical vector such that the rain entering the distal end of the exhaust passageway may flow downwardly along the interior surface of the fluid exhaust passageway toward the intake manifold;
- said internal surface of the exhaust passageway defining one or more circumferentially disposed and outwardly extending grooves, with the one or more grooves having an inner surface which extends to an outer diameter greater than the outer diameter of the internal surface of the exhaust passageway proximate the one or more grooves on either side thereof, such that the rain flowing downwardly along the interior surface of the fluid exhaust passage flows into the one or more outwardly extending grooves;
- at least one open hole in the outwardly extending grooves through which rain flowing into the one or more grooves may pass out of the exhaust passageway such that at least a portion of the rain entering the proximal end of the exhaust passageway may be prevented from passing downwardly below the one or more grooves of the exhaust passageway.

\* \* \* \* \*